Figure 1:

United States Patent [19]

Dahlgren

[11] 4,044,367
[45] Aug. 23, 1977

[54] ROLLER BLIND SHUTTER FOR CAMERAS
[75] Inventor: Lennart Dahlgren, Vastra Frolunda, Sweden
[73] Assignee: Fritz Victor Hasselblad, Goteburg, Sweden
[21] Appl. No.: 621,847
[22] Filed: Oct. 14, 1975
[30] Foreign Application Priority Data
Nov. 15, 1974 Sweden .............................. 7414378
[51] Int. Cl.² .............................................. G03B 9/32
[52] U.S. Cl. .................................................. 354/242
[58] Field of Search ................ 354/241, 242, 243, 244
[56] References Cited
U.S. PATENT DOCUMENTS
2,526,432  10/1950  Svensson ............................ 354/241
3,685,423  8/1972  Dahlgren ............................ 354/241

FOREIGN PATENT DOCUMENTS
348,059  11/1972  Sweden ................. 354/242
331,788  4/1971  Sweden ................. 354/242
132,202  6/1944  Sweden ................. 354/242

Primary Examiner—L. T. Hix
Assistant Examiner—Alan Mathews
Attorney, Agent, or Firm—Sherman & Shalloway

[57] ABSTRACT

A roller-blind shutter having transverse depressions forming long plateaus in one of a pair of opening and closing shutters which exceed the length of the transverse depressions in the other of the curtains in the region in which they overlap on a spool when the shutter is cocked.

5 Claims, 6 Drawing Figures

ROLLER BLIND SHUTTER FOR CAMERAS

This invention relates to photographic cameras provided with roller-blind shutter of the kind, having two curtains which, in cocked state of the shutter, partially overlap each other, and both sides of the curtains show alternatingly raised and sunk portions, when seen in the direction of motion of the curtain. The invention has the object to improve the rapidness and precision of the shutter by modifying the profile of the overlapping curtain portions in such a manner, that those raised and sunk portions of the two curtains facing toward each other cannot engage with each other.

Swedish patent specificaton No. 348 059 describes a roller-blind shutter of the kind, which is characterized by high precision and rapidness and which is intended for cameras with a relatively large picture size of 6 × 6 cm and larger. The shutter comprises an opening curtain and a closing curtain. Between the edges of the curtains an exposing slit moves past the film gate of the camera with a constant speed when the shutter is released. Before the slit forming edges enter the film gate, the curtains must be accelerated from standstill to said constant speed. For space reasons, the acceleration distance of the curtains is desired to be as short as possible, which requires a low and uniform running resistance for the curtains in their guides. Even when these requirements are met, the acceleration distance will be relatively long due to the necessary high speed and the large picture size and implies, with roller-blind shutters of conventional design, that the distance between the respective axles of the curtains substantially exceeds the width of the film gate. In order not to unnecessarily increase the width of the shutter, which would result in a larger and more clumsy camera, in the shutter according to Swedish patent specification No. 348 059 an expedient has been applied in that, at cocked shutter position, the opening curtain is made to overlap the closing curtain by a short distance. This overlap may be about one quarter of a revolution of the axle of the closing curtain, whereby the necessary axle distance is reduced due to the deflection of the opening curtain about said opposite axle. Upon release of the shutter, the curtains start with a time interval, which brings about a slit width between the curtain edges corresponding to the preselected or set shutter speed. This implies, for a shutter according to Swedish patent specification No. 348 059, that the opening or first-moving curtain must slide a distance, which can amount to the length of the overlapping piece, over the closing second curtain while it is still standing still. This slide motion must take place smoothly and uniformly in order that the rapidness and precision of the shutter will be as desired.

It was found that, for shutters according to Swedish patent specification No. 348 059, the curtains designed on a principle according to anyone of Swedish patent specification Nos. 132 202 and 331 788, are expedient. These curtains are of light weight and produce a low winding-on and -off resistance, but show a high transverse bending resistance perpendicularly to the direction of motion of the curtains. These properties are obtained, according to Swedish patent specification No. 132 202, in that a thin metal sheet or foil is folded perpendicularly to the direction of its motion. According to Swedish patent specification 331 788, the desired properties are achieved in that the curtain is designed with alternatingly thinner and thicker portions, as seen in the direction of motion, and the curtain is made of a plastic film or another flexible material. The two described curtain types and some additional known curtains have, in common, the fact that they show on both sides of the curtain alternatingly raised and sunk portions, which often are shaped so as to render possible an engagement between overlapping curtain layers. For example, this might occur between the first and the second curtain in the above-described shutter according to Swedish patent specification No. 348 059. Even when the curtains are given such a profile shape that the curtains will not engage each other in a fully self-locking manner, in the aforementioned case, the first curtain in its sliding over the second curtain will be alternatingly in and out of at least partial engagement and thereby cause an unnecessarily sluggish and jerky operation of the shutter. This disadvantage of the prior curtain types, which in general are otherwise very well adapted for use in the described shutter, cannot be accepted because it renders precision and rapidness of the shutter impossible.

The present invention has the object of preventing the curtains, during the described overlapping, from engagement with each other, while maintaining the good properties of the described known curtain types and without unnecessarily making their manufacture more intricate.

According to the invention, such engagement between overlapping portions of the curtains. In the cocked state of the shutter, is prevented in that the portion of the first curtain which overlaps the second curtain is provided with a profile shape deviating from that of the second curtain and that of the remaining part of the first curtain. In order not to loose the good properties of the curtains, said deviating profile shape is restricted so that the raised and the sunk portions, respectively, of the overlapping portion of the curtain are designed with a greater length than the corresponding portions on the second curtain and the remaining part of the first curtain. Said greater length is chosen so that the sunk portions of the first curtain in the region of said overlapping will rest against the raised portions of the second curtain. Therefore the first curtain, upon release of the shutter, can slide smoothly and uniformly over the second curtain which is standing still. The two profiles are in other respects identical and, thus, have the same profile height and the same kind of transitions between the raised and sunk portions of the curtains.

Figure 2:
Figure 3:
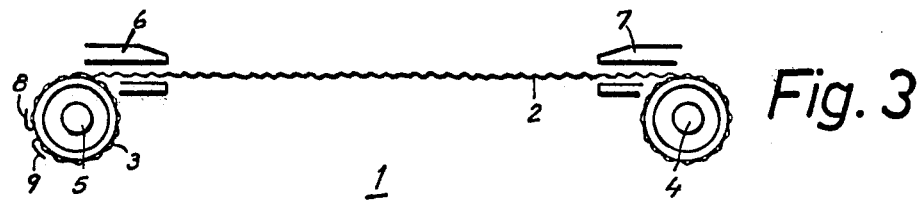
Figures 4, 5:
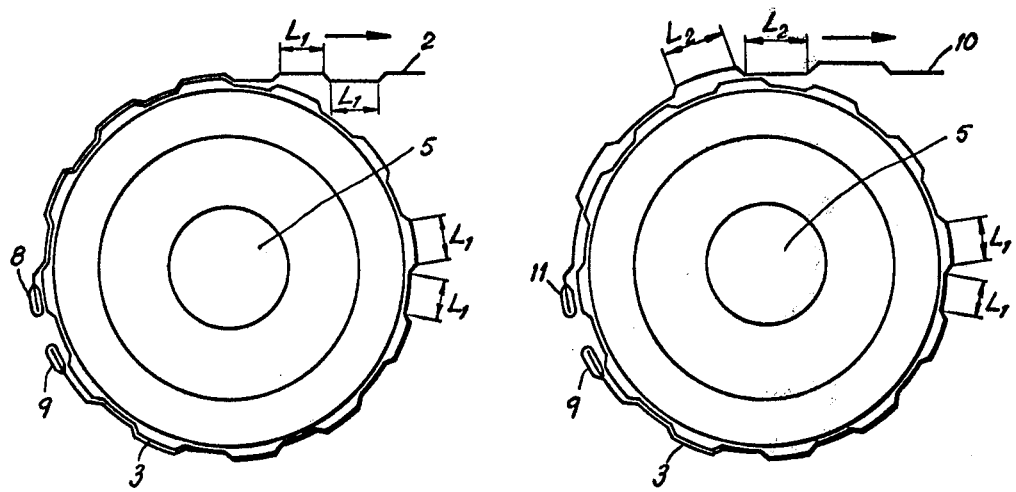
Figure 6:
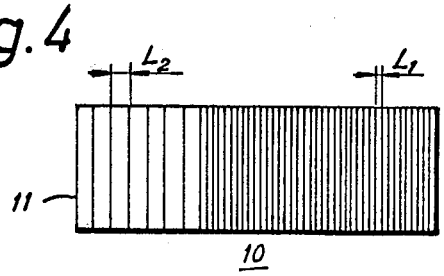

A preferred embodiment of the invention is described in greater detail in the following, with reference to the accompanying drawing, in which FIG. 1 is a top or edge view of a folded curtain of uniform thickness, FIG. 2 is a top or edge view of a curtain with alternating thin and thick portions in the direction of motion of the curtain;

FIG. 3 is a schematic view, taken from above, of a known roller blind shutter in cocked position, FIG. 4 is a detail view on an enlarged scale of the left-hand part of FIG. 3, FIG. 5 is a view similar to FIG. 4, but shows the present invention as applied in a preferred embodiment, and FIG. 6 is a horizontal view of an opening curtain portion according to the invention.

Previously, curtains for roller blind shutters were manufactured so as to produce low bending resistance at winding on and off a curtain axle, but a relatively high bending resistance perpendicularly to the direction of motion of the curtain. These properties can be attained by two curtain types, which are different in principle. One type, which here is preferred, is formed from a very thin metal foil, e.g. of titanium or stainless steel. The foil is folded, perpendicularly to the direction of motion of the curtain, to a suitable wave shape. This may be the shape here preferred and shown in FIG. 1, with low plane waves or plateous and relatively sharp folds, but may also be given another shape such as a sine-curve shape. The other type refers to curtains made of cloth, plastics, rubber and similar flexible materials. The curtains of this latter type are given the desired properties in that they are manufactured with alternatingly thin and thickened portions in the direction of motion of the curtain. This can be accomplished in several different ways not concerning the present invention. In FIG. 2 an example of the latter curtain type is shown. The curtain types shown in FIGS. 1 and 2 have, in common, a constant length of the waves and, respectively, of the thick and thin portions, as this has proved suitable.

The curtains according to FIGS. 1 and 2 are used for example in a roller-blind shutter 1 such as is known from Swedish patent specification No. 348 059. Its details concerned by the present invention are apparent from FIG. 3, which shows the roller blind shutter in cocked position. The shutter comprises a first or opening curtain 2 and a second or closing curtain 3 with associated curtain axles 4 and 5, respectively, on which the curtains are wound on and off when the shutter 1 is cocked and released. The film gate of the camera is defined by gate edges 6, 7. Upon release of the shutter 1, first the first curtain 2 is released, and after a specific time interval corresponding to a selected or set shutter speed, the second curtain 3 is then released, with a slit "S" formed between the edges 8 and 9, respectively, of the curtains. The slit "S" moves past the film gate and exposes the film. The feature by which the shutter 1 shown in FIG. 3 differs from other known roller-blind shutters is a. o. that the first curtain 2, in the cocked state of the shutter, moves past the film gate edge 6 such a distance that a piece of the first curtain 2 is wound on the outside of the second curtain 3 on the axle 5 of the second curtain. The shutter 1, which is intended for high shutter speeds and preferably for cameras with the picture size of 6 × 6 cm or larger, requires a relatively long acceleration distance before the curtain edges 8 and 9, respectively, move past the edge 6. By making the curtains 2, 3 overlap each other on the axle 5 by about one quarter of a revolution, the requirement of a sufficiently long acceleration distance is met without increasing the distance between the axles 4, 5, which, in its turn, would have resulted in an undesired larger and more clumsy camera.

The known curtain according to FIGS. 1 and 2 are very well adapted for use in the shutter 1 according to FIG. 3. When, however, the curtains have a profile with portions alternatingly projecting and inward bulging and equal in length, for example as shown in FIGS. 1 and 2, it is easily understood, that projecting portions in a curtain layer can engage with corresponding inward bulging portions in a curtain layer lying outside thereon. Such an engagement between adjacent curtain layers does not imply an appreciable disadvantage as long as only one curtain is wound on per curtain-axle. However, with an overlapping between the first and the second curtain 2 and 3, respectively, on the axle 5, an engagement between the curtains, as shown in FIG. 4, is a substantial disadvantage. From the start of the release operation until the slit "S" between the curtain edges 8 and 9 has fully developed, only the first curtain 2 moves in the direction of the arrow, (FIG. 4), while the second curtain 3 with the curtain axle 5 is still locked. This means that the first curtain 2 must slide over the second curtain 3 said overlapping distance. This sliding must take place, in view of the rapidness and precision required of the shutter 1, with a low friction as well as with a rapid and uniform acceleration. It appears from the aforedescribed release operation, that any profile shape of the curtains 2, 3 with engagement between the curtains which is self-locking, is entirely unsuitable for use in the shutter 1, because no slit between the curtain edges 8 and 9 could ever be formed. The profile shapes in principle as shown in FIGS. 1 and 2, with low profile height and obtusely angular or rounded transitions between the projecting and inward bulging portions of the curtain, are not selflocking and, therefore, a profile shape according to the example shown in FIG. 4 would permit the first curtain 2 to slide over the second curtain 3. Such a profile shape, however, cannot be applied in practice, because the curtains 2, 3 would be alternatingly in and out of intermittent engagement with each other when the first curtain 2 moves over the second curtain 3. This would result in a sluggish and jerky operation of the shutter arrangement and a serious disadvantage.

The aforesaid disadvantage is overcome, according to the invention, in that at least the portion of the first curtain 2 which, in the cocked state of the shutter 1, covers the second curtain 3 is given a profile shape which renders engagement between the curtains impossible. In FIGS. 5 and 6 a preferred embodiment of the invention is shown in which the curtains are made of a folded metal foil in principle as shown in FIGS. 1 and 4. The second curtain 3 has been maintained unchanged from the example shown in FIG. 4, in which the tops and bottoms of the raised and, respectively, sunk portions of the curtain 3 have the same longitudinal length $L_1$, which is corresponded by a relatively short division length of the folds in the curtain 3. However, the new arrangement comprises a first or opening curtain 10 which, beginning from its opening edge 11 and for a distance corresponding at least to the overlap portion covering the second curtain 3 on the axle 5, has a profile shape deviating from the second curtain 3 and the remaining part of the first curtain 10. Said deviation is accomplished in that the projecting and inward bulging portions of the first curtain on said overlapping portion have been given a longitudinal length $L_2$ exceeding substantially the corresponding longitudinal length $L_1$ of the other curtain portions (see FIGS. 5 and 6). As appears from FIG. 5, the curtains 3, 10 are thereby prevented from engaging with each other on the axle 5. The invention, thus, renders it possible by simple means that, for a roller-blind shutter 1, the curtains well adapted for use in this type of shutter and as shown by way of example in FIGS. 1 and 2, can be used without engaging with each other in an undesired manner, as shown in FIG. 4.

Within the basic idea of the invention, also other embodiments of the invention than that shown in the drawings can be imagined. It is, for example, possible to vary the length of the raised and sunk portions in different ways so that no engagement between the curtains will be possible.

I claim:

1. A shutter for cameras including,
   a. an opening curtain and
   b. a closing curtain,
   c. a transverse slit formed between said curtains,
   d. drive means for traversing said curtains and said transverse slit formed therebetween longitudinally of said curtains from a first position to a second position, said drive means including,
   e. axle means for receiving said closing curtain wound thereon and for receiving a portion of said opening curtain wound at least partially thereon in overlapped relationship with a portion of said closing curtain in said first position,
   f. said opening curtain and said closing curtain having transverse depressions therein,
   g. said transverse depressions forming
   h. planar plateaus and intermediate,
   i. planar valleys separated by
   j. transition areas,
   k. the longitudinal length of the plateaus of one of said curtains being substantially greater than the longitudinal length of the planar valleys of the other of said curtains in the region of overlap of the curtains in said first position.

2. The shutter of claim 1 in which said opening and closing curtains are formed of metal sheets of uniform thickness.

3. The shutter of claim 1 in which the opening and closing curtains are formed of flexible material and said depressions are formed by thin transverse areas.

4. The shutter of claim 1 in which the plateaus having the greater length are formed in the opening curtain.

5. The shutter of claim 4 in which the plateaus having the greater length are substantially greater in length than the remaining plateaus of the opening curtain.

* * * * *